No. 676,867. Patented June 25, 1901.
E. BLAUHORN.
LUBRICATING PUMP.
(Application filed Dec. 19, 1900.)
(No Model.)
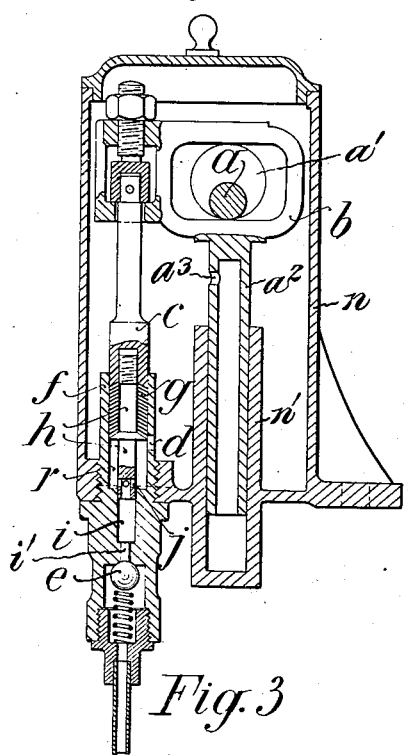
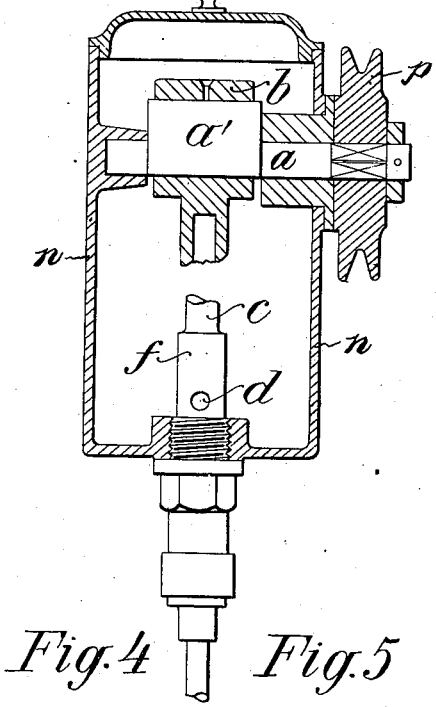
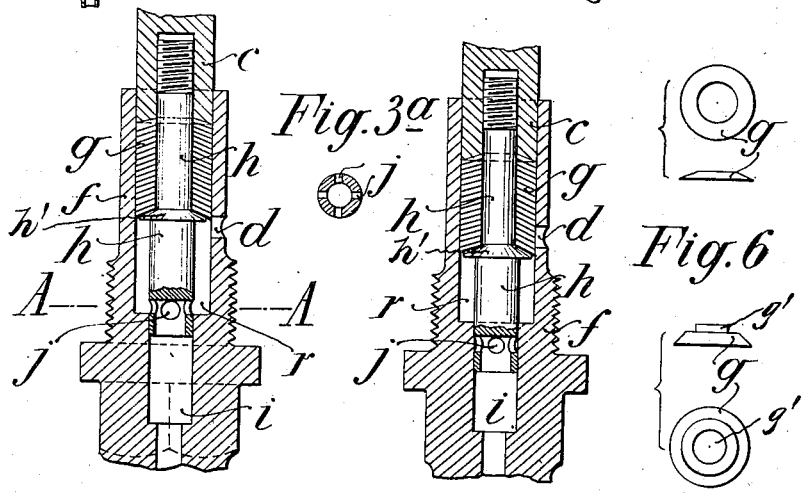

UNITED STATES PATENT OFFICE.

EMANUEL BLAUHORN, OF VIENNA, AUSTRIA-HUNGARY, ASSIGNOR TO THE FIRM OF ALEX. FRIEDMANN, OF SAME PLACE.

LUBRICATING-PUMP.

SPECIFICATION forming part of Letters Patent No. 676,867, dated June 25, 1901.

Application filed December 19, 1900. Serial No. 40,422. (No model.)

*To all whom it may concern:*

Be it known that I, EMANUEL BLAUHORN, a subject of the Emperor of Austria-Hungary, residing at Vienna, in the Province of Lower Austria, in the Empire of Austria-Hungary, have invented certain new and useful Improvements in Lubricating-Pumps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
My invention has relation to that type of lubricating-pumps in which the oil-feed port leading from the oil-reservoir to the pump barrel or casing is closed during the forcing stroke of the plunger, the difficulty of maintaining a tight joint between plunger and pump-barrel and preventing oil from being forced back into the oil-reservoir being well known.

This invention has for its object a construction whereby this difficulty is avoided, and this I attain by means of a differential plunger the greater portion of the part of greater area of which is composed of a multiplicity of more or less elastic or resilient elements—as, for instance, elements made of a more or less elastic or resilient sheet metal having the form of a frustum of a cone, while part of the plunger of less area is not fitted to work fluid-tight in the barrel.
That my invention may be fully understood, I will describe the same in detail, reference being had to the accompanying drawings, in which—

Figure 1 is a vertical section of a lubricating-pump embodying my improvements. Fig. 2 is a fragmentary vertical section taken at right angles to the section Fig. 1. Figs. 3 and 4 are fragmentary vertical sections of the pump-barrel drawn to an enlarged scale and showing the plunger in different operative positions. Fig. 3$^a$ is a cross-section of the plunger on line A A of Fig. 3, and Figs. 5 and 6 show each in plan and elevation different forms of the elastic or resilient elements of which the part of greater area of the differential plunger is chiefly composed.

Referring to Figs. 1 and 2, $n$ indicates the oil-reservoir, in which are formed suitable bearings for a shaft $a$, that carries a cord or belt pulley $p$ at its outer end, intended to be driven by a moving element of the engine to be lubricated. The spindle $a$ also carries an eccentric $a'$, that works in a yoke $b$, secured to the pump plunger-rod $c$, and said yoke has a tubular extension $a^2$, open at its lower end and provided with a port $a^3$, which extension works in a guide-cylinder $n'$, preferably integral with the oil-reservoir $n$, as shown, to properly guide the reciprocating movements of the plunger-rod $c$, the construction of guide as described being designed to reduce frictional resistance to said movements of the plunger-rod to a minimum.

The pump-barrel $f$ has a differential chamber in which works a differential plunger $h$, the part of greater area of said plunger working in a corresponding chamber $r$ of the barrel $f$, and is composed of a number of more or less elastic or resilient elements—as, for instance, discoidal elements $g$—made of a suitable sheet metal, as brass, copper, or the like and having the form of a frustum of a cone, as shown more clearly in Fig. 5, though I prefer to form them with a collar $g'$, Fig. 6, so as to better support one another. These disks are threaded on the plunger-rod $h$ and held in position by a suitably-coned collar $h'$, which of course does not fit the chamber $r$ fluid-tight, while the elements $g$ above said collar fit the chamber snugly. This chamber has a feed or suction port $d$ in communication with the oil-reservoir $n$, and in the chamber $i$ of smaller cross-sectional area works the plunger part of smaller area, said chamber $i$ having a discharge port or passage $i'$, normally closed by a spring-seated check-valve $e$—for instance, a ball-valve, as shown in Fig. 1. The plunger part of smaller area although fitting chamber $i$ somewhat closely does not fit the same absolutely fluid-tight, and the lower end of said plunger is recessed and has ports $j$.

The operation of the described pump is as follows: On the suction or up stroke of plunger $h$ a partial vacuum is created in chamber $r$, and as said plunger reaches or is about to reach the limit of its said suction-stroke the portion of greater area of the plunger uncovers suction-port $d$, Figs. 1 and 3, lubricant being drawn into chamber $r$ and flowing thence through plunger-ports $j$ into the chamber $i$ of smaller cross-sectional area, the lubricant being prevented from flowing out of said chamber by the check-valve $e$. On the down or forcing stroke of the plunger and as soon as the lower disk $g$ of the series has moved below the suction-port $d$ the latter will be completely closed, and a comparatively high pressure will be set up in chamber $r$, even under a comparatively slow movement of the plunger, by the pressure exerted by the collar $h'$ and disks $g$ on the lubricant in chamber $r$. In view of the fact that the lubricant cannot escape freely from said chamber into chamber $i$ around the plunger and under said pressure the disks $g$ are forced upwardly and spread out, forming a fluid-tight joint with the walls of the pump-chamber $r$, while the pressure exerted by the smaller face of the plunger on the lubricant in $i$ unseats the check-valve $e$ and drives the lubricant out of chamber $r$.

The relative arrangement of the differential faces of the plunger is, as clearly shown, such that the smaller end of said plunger will have entered chamber $i$ and the plunger-ports $j$ will be covered by the chamber-walls when the lowermost disk $g$ has cleared the suction-port $d$, as shown in Fig. 4. Notwithstanding the fact that the smaller end of the plunger does not fit its chamber $i$ perfectly fluid-tight there is practically no escape of oil from said chamber $i$ to chamber $r$ on the downstroke of the plunger before the ports $d$ and $j$ are closed, the clearance between the smaller end of the plunger and the inner walls of the pump-chamber $i$ being practically infinitesimal, yet not absolutely fluid-tight, thus avoiding the necessity of packing the plunger.

Having thus described my invention, what I claim as new therein, and desire to secure by Letters Patent, is—

1. In a lubricating-pump, a pump-barrel having chambers of different cross-sectional areas and a differential plunger working in said chambers, the smaller part of said plunger fitting its chamber snugly but not fluid-tight, the larger part of such plunger comprising a head of less diameter than that of the larger pump-chamber and a plurality of more or less elastic elements supported from said head and adapted to spread and form a fluid-tight joint with the chamber-walls, a suction-port in said larger chamber controlled by the larger part of the plunger, a port or ports controlled by the smaller part of the plunger and adapted to establish communication between the pump-chambers, a discharge-port in the smaller pump-chamber and a check-valve normally closing said port, for the purposes set forth.

2. A lubricating-pump, comprising a lubricant-reservoir, a pump contained therein and having chambers of different cross-sectional areas, a suction-port in the larger chamber opening into said reservoir, a discharge-port in the smaller chamber and a check-valve normally closing the same; in combination with a differential plunger the smaller part working in the smaller pump-chamber and provided with ports, the larger part of said plunger controlling the aforesaid suction-port and working in the larger pump-chamber, and comprising a head of less diameter than said chamber and a plurality of more or less elastic or resilient elements supported from said head, adapted to spread or expand and form a fluid-tight joint with the chamber-walls, and means for reciprocating the plunger, for the purposes set forth.

3. In a lubricating-pump, a pump-barrel having chambers of different cross-sectional areas and a differential plunger working in said chambers, the smaller part of said plunger fitting its chamber snugly but not fluid-tight, the larger part of said plunger comprising a head of less diameter than that of the larger pump-chamber and a plurality of more or less elastic sheet-metal discoidal elements supported from said head and adapted to spread and form a fluid-tight joint with the chamber-walls, a suction-port in said larger chamber controlled by the larger part of the plunger, a port or ports controlled by the smaller part of the plunger and adapted to establish communication between the pump-chambers, a discharge-port in the smaller pump-chamber and a check-valve normally closing said port, for the purposes set forth.

4. In a lubricating-pump, a pump-barrel having chambers of different cross-sectional areas and a differential plunger working in said chambers, the smaller part of said plunger fitting its chamber snugly but not fluid-tight, the larger part of such plunger comprising a head of less diameter than that of the larger pump-chamber and a plurality of more or less elastic sheet-metal elements having the form of a hollow frustum of a cone, supported from said head and adapted to spread and form a fluid-tight joint with the chamber-walls, a suction-port in said larger chamber controlled by the larger part of the plunger, a port or ports controlled by the smaller part of the plunger and adapted to establish communication between the pump-chambers, a discharge-port in the smaller pump-chamber and a check-valve normally closing said port, for the purposes set forth.

5. In a pump having suction and forcing chambers of different cross-sectional areas, a differential plunger working in said chambers, the larger part of said plunger comprising a head of less diameter than that of the larger chamber and a plurality of elements expansible under pressure to form a fluid-tight joint with the walls of its chamber, for the purposes set forth.

6. In a pump having suction and forcing chambers of different cross-sectional areas, a differential plunger working in said chambers, the larger part of said plunger comprising a head of less diameter than that of the larger chamber and a plurality of more or less elastic or resilient sheet-metal elements $g$, expansible under pressure to form a fluid-tight joint with the walls of its chamber, for the purpose set forth.

In testimony that I claim the foregoing as my invention I have signed my name in presence of two subscribing witnesses.

EMANUEL BLAUHORN.

Witnesses:
GUSTAV PHILIPPETSCH,
ALVESTO S. HOGUE.